Feb. 23, 1926.

A. O. HUBBARD

WAGON AXLE

Filed April 14, 1922

1,574,036

Inventor
ARTHUR O. HUBBARD
By Paul & Paul
ATTORNEYS

Patented Feb. 23, 1926.

1,574,036

UNITED STATES PATENT OFFICE.

ARTHUR O. HUBBARD, OF MINNEAPOLIS, MINNESOTA; NELLIE H. HUBBARD, EXECUTRIX OF SAID ARTHUR O. HUBBARD, DECEASED, ASSIGNOR TO PUFFER-HUBBARD MANUFACTURING COMPANY, OF MINNEAPOLIS, MINNESOTA, A CORPORATION OF MINNESOTA.

WAGON AXLE.

Application filed April 14, 1922. Serial No. 552,470.

*To all whom it may concern:*

Be it known that I, ARTHUR O. HUBBARD, a citizen of the United States, resident of Minneapolis, county of Hennepin, State of Minnesota, have invented certain new and useful Improvements in Wagon Axles, of which the following is a specification.

The object of my invention is to provide a means for bracing and strengthening a wagon axle, particularly the forward axle, so that it will not bend or buckle under load and will permit the use of a smaller axle than would ordinarily be desirable or necessary for the purpose.

A further object is to provide a truss-like supporting or bracing member for the axle which, in addition to its function of stiffening the middle portion of the axle, will also form an abutment for the hubs of the wheels.

Other objects of the invention will appear from the following detailed description.

In the accompanying drawings forming part of this specification,

Figure 3:
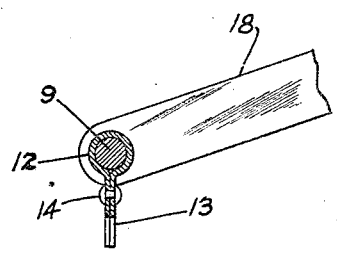
Figure 3 is a sectional view on the line 3—3 of Figure 1.
Figure 1:
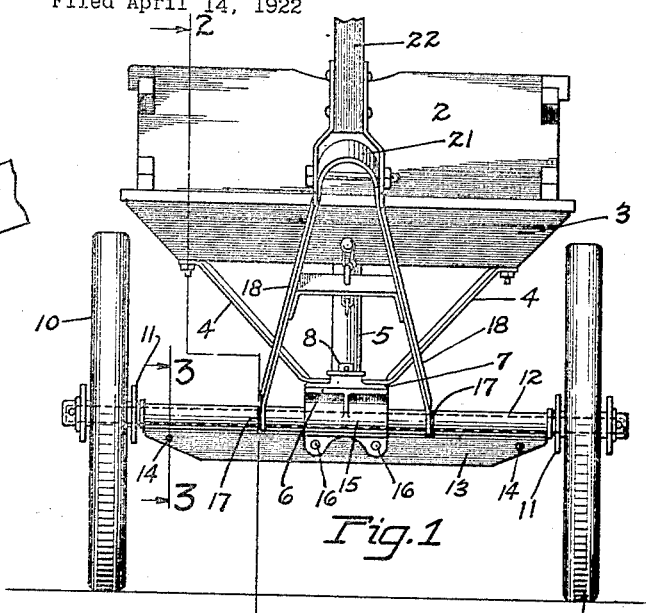
Figure 1 is a front elevation of a wagon embodying my invention.

In the drawing, 2 represents the wagon box, 3 the cross bar extending transversely thereof, 4 diagonal braces secured to the ends of the cross bar and inwardly and downwardly inclined to meet a forwardly inclined brace 5 that is secured to the bottom of the wagon body. A plate 6 has a flat surface on which a disc 7 is seated, and secured to the ends of the braces and provided with a central opening to receive an upwardly projecting stud 8, the meeting plates forming the fifth wheel of the wagon.

The forward axle 9 has supporting wheels 10 with hubs 11, and between the wheels and embracing the axle is a truss member 12 that encircles the axle and has flanged edges 13 riveted together. These flanged edges are comparatively wide and when secured form a substantial bracing means to resist downward thrust of the axle. I prefer to rivet the flanges together at points 14 near the ends and the depending webs 15 of the plate 6 are also riveted together through the flanges, at 16. The ends of the truss member extend to points near the ends of the axle where they form abutments for the wheel hubs, thereby dispensing with collars or stops at this point.

Figure 4:
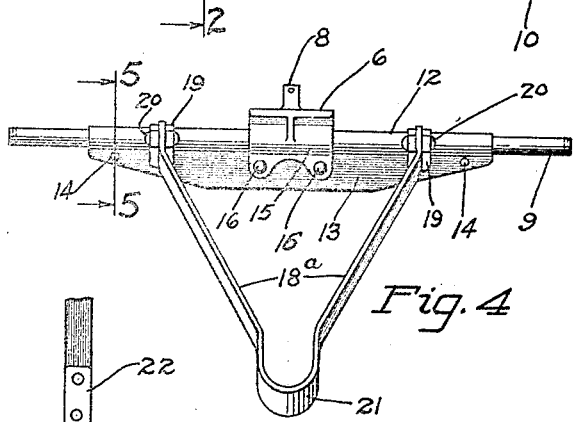
Figure 4 is a detail view, showing the axle and its truss support removed from the wagon, and a modified means for connecting the hounds to the axle.
Figure 2:
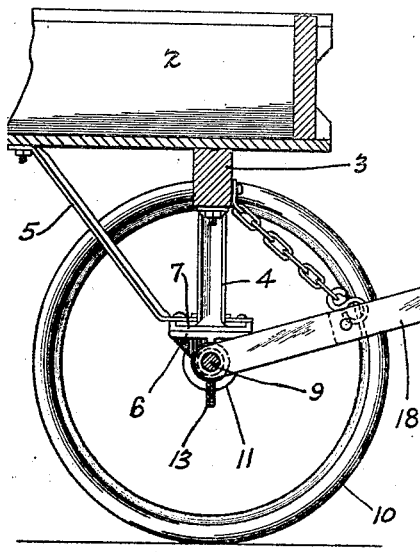
Figure 2 is a vertical sectional view on the line 2—2 of Figure 1.
Figure 5:
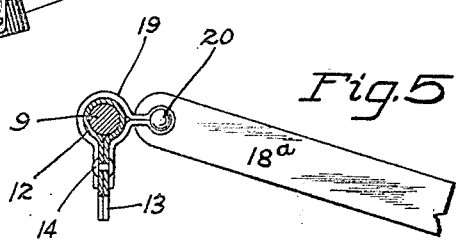
Figure 5 is a sectional view on the line 5—5 of Figure 4.

I may also provide slots 17 in the truss member to receive the hounds 18 which have holes therein through which the axle is inserted. As shown in Figures 4 and 5, I may place clips 19 on the truss member and then pivot the hounds 18ª to these clips, as indicated at 20. A loop 21 is preferably formed in the hounds at the outer ends thereof and to this loop the wagon tongue 22 is pivotally connected.

I claim as my invention:

1. The combination, with an axle and its supporting wheels, of a truss sleeve enclosing the axle between the wheels and having depending flanged edges secured together forming a longitudinal brace to resist downward thrust on the axle, the ends of said sleeve forming abutments for the wheel hubs.

2. The combination, with an axle, of a plate of sheet metal folded around the axle and having its abutting edges secured together to form a longitudinal truss flange, said plate having transverse slots therein to receive the ends of the axle hounds through which ends the axle projects.

3. The combination, with an axle, of a sheet metal plate folded around the axle to form a sleeve or housing thereon, the longitudinal edges of said plate being secured together and forming a truss flange, said plate having transverse slots therein and a loop having holes in the ends thereof to receive said axle when said ends are inserted into said slots, and a tongue attached to said loop.

4. The combination, with an axle, of a sheet metal plate folded to form a sleeve or housing therefor and having projecting flanged edges secured together to form a longitudinal truss brace, a block seated on the middle portion of said housing and having a depending web secured to said truss brace and a substantially flat upper surface and stud thereon.

5. The combination with an axle, of a plate of sheet metal folded around the axle and having its abutting edges secured together to form a longitudinal truss flange to resist downward thrust on the axle and a block seated on said plate and having a depending web secured to said flange below said axle.

In witness whereof I have hereunto set my hand this tenth day of April 1922.

ARTHUR O. HUBBARD.